United States Patent
Long

(10) Patent No.: US 7,979,360 B2
(45) Date of Patent: Jul. 12, 2011

(54) ERROR PROPAGATION IN CALCULATION WITH CONDITIONAL ALTERNATIVES

(75) Inventor: Richard F. Long, Oviedo, FL (US)

(73) Assignee: Accenture Global Services Limited, Dublin (IE)

( * ) Notice: Subject to any disclaimer, the term of this patent is extended or adjusted under 35 U.S.C. 154(b) by 548 days.

(21) Appl. No.: 11/754,395

(22) Filed: May 29, 2007

(65) Prior Publication Data

US 2008/0301066 A1    Dec. 4, 2008

(51) Int. Cl.
*G06F 17/00* (2006.01)
(52) U.S. Cl. ........................................................ 705/400
(58) Field of Classification Search .................. 705/400, 705/412, 1, 7, 8, 10; 700/36, 33, 32, 28, 700/286–291, 295, 297, 34, 44; 703/2
See application file for complete search history.

(56) References Cited

U.S. PATENT DOCUMENTS

| | | | |
|---|---|---|---|
| 6,278,899 B1 * | 8/2001 | Piche et al. | 700/44 |
| 2003/0083787 A1 * | 5/2003 | Harada et al. | 700/291 |
| 2004/0254899 A1 * | 12/2004 | Abe et al. | 705/412 |
| 2009/0254225 A1 * | 10/2009 | Boucher et al. | 700/295 |

OTHER PUBLICATIONS

"College Algebra Tutorial 58: Probability", http://www.wtamu.edu/academic/anns/mps/math/mathlab/col_algebra/col_alg_tut58_prob.htm, asserts last update of Jun. 23, 2003.
Vern Lindberg, "Uncertainties and Error Propagation Part I of a manual on Uncertainties, Graphing, and the Vernier Caliper", Section 5 (Propagation of Errors, Basic Rules), http://www.rit.edu/~uphysics/uncertainties/Uncertaintiespart2.html#addsub, Jun. 1, 2000.

* cited by examiner

Primary Examiner — Igor Borissov

(57) ABSTRACT

The result of a first calculation may be determined by one of two alternative calculations. Each of the alternative calculations has an error associated therewith (due to factors such as measurement imprecision, rounding, etc.), and these errors propagate to the first calculation. However, there may also be error in the first calculation due to uncertainty about which of the alternative calculations applies. Such error can be taken into account based on the respective probabilities that the first and second calculations will apply, as well as the difference in the results produced by the two calculations.

12 Claims, 6 Drawing Sheets

$$(c, \varepsilon_c) = \left( \mu a + (1-\mu)b, \sqrt{(\mu\varepsilon_a)^2 + ((1-\mu)\varepsilon_b)^2 + \mu(1-\mu)(a-b)^2} \right)$$

ERROR PROPAGATION IN CALCULATION WITH CONDITIONAL ALTERNATIVES

BACKGROUND

Calculations over input variables can be used to produce one or more results, and the results typically have an associated error. This error can be due to various factors, such as imprecise measurement, rounding, etc. For example, if a calculation produces a dollar amount rounded to the nearest penny, then this rounding contributes to an error of ±$0.005 cents, due to the fact that a calculated result such as $16.72 could actually represent any amount between $16.715 and $16.725.

Some calculations are based on alternatives of different calculations. For example, consider two calculations represented by the two functions $f(x)$ and $g(x)$. A third calculation, $h(x)$, could be based on the rules $h(x)=f(x)$, if $x \leq 10$, and $h(x)=g(x)$, if $x>10$. If $f(x)$ and $g(x)$ each have associated errors, $\epsilon_a$ and $\epsilon_b$, respectively, then $h(x)$ inherits error from functions $f$ and $g$. However, $h(x)$ also has a third potential source of error, based on the uncertainty as to whether $h(x)$ will, in a given case, be determined by $f(x)$ or $g(x)$. When x is very near the boundary between where $f$ applies and where $g$ applies (e.g., where $x \approx 10$), uncertainty about the exact value of x can also create uncertainty as to whether $f$ or $g$ applies, and this uncertainty is a third source of error apart from $\epsilon_a$ and $\epsilon_b$. One may wish to take this third source of error into account.

SUMMARY

One calculation, e.g., $h(x)$, can be based on other calculations, e.g., $f(x)$ and $g(x)$. $h(x)$ may be determined by $f(x)$ if one set of circumstances exists, and may be determined by $g(x)$ if a different set of circumstances exists. $f$ and $g$ each have errors associated with them, which are based on factors such as measurement, rounding, etc. A probability, $\mu$, is the chance that $f(x)$ will be the calculation that determines $h(x)$. In the non-limiting example in which $f$ and $g$ are the two calculations on which h might be based, if $\mu$ is the probability that $f$ will determine h, then $1-\mu$ (a complement of $\mu$) is the probability that g will determine h. In determining the error associated with h, one may take into account factors such as: the error associated with $f$; the error associated with g; and the uncertainty as to whether the ambient circumstances will cause $f$ to apply or will cause g to apply. When the input value x is near a boundary that decides whether h is determined by $f$ or by g, and where that boundary represents a discontinuity between $f$ and g, then a small amount of uncertainty in the input value x can create a larger uncertainty as to the value of $h(x)$, due to the uncertainty as to whether $h(x)$ equals $f(x)$ or $g(x)$.

In one example, the subject matter described therein comprises a system for determining an error associated with calculating a cost of energy, the system comprising: one or more processors; one or more data remembrance devices; software that is stored in at least one of the one or more data remembrance devices and that executes on at least one of the one or more processors, wherein the software has functionality comprising: first functionality that performs a first calculation of the cost of energy, a first error being associated with the first calculation, the cost of energy being determined by the first calculation where one or more variables associated used in the first calculation satisfy one or more criteria; second functionality that performs a second calculation of the cost of energy, a second error being associated with the first calculation, the cost of energy being determined by the second calculation in at least one circumstance where the one or more variables do not satisfy the one or more criteria; third functionality that calculates a third error as a square root of a sum of components comprising: a first square of a first product of factors comprising: a probability that the one or more variables satisfy the one or more criteria; and the first error; a second square of a first product of factors comprising: a complement of the probability; and the second error; and a third product of factors comprising: the probability; the complement of the probability; and a third square of a difference based on the first calculation and the second calculation; and fourth functionality that does at least one of the following: displays the third error; communicates the third error over a network; and propagates the third error to a calculation of a fourth error associated with a fourth calculation, the fourth calculation being based on the third calculation.

In another example, the subject matter described herein comprises one or more computer-readable storage media having executable instructions to perform a method of calculating an error, the method comprising: calculating a first value equal to:

$$\sqrt{(\mu \epsilon_a)^2 + ((1-\mu)\epsilon_b)^2 + \mu(1-\mu)(a-b)^2}$$

where a comprises a second value determined by a first calculation, A, where b comprises a third value determined by a second calculation, B, where $\epsilon_a$ is a first error associated with the first calculation, where $\epsilon_b$ is a second error associated with the second calculation, wherein a third calculation, C, is determined by the first calculation or the second calculation depending on circumstances, and wherein $\mu$ is a probability that the circumstances will cause the third calculation to be determined by the first calculation; and doing at least one of the following: displaying the first value; communicating the first value over a network; and propagating the first value to a calculation of a third error associated with a fourth calculation, the fourth calculation being based on the third calculation.

In another example, the subject matter described herein comprises a method of determining an error associated with a first calculation that is based on one or more of a plurality of second calculations, the plurality of second calculations comprising a third calculation and a fourth calculation, the method comprising: producing a first value by calculating a square root of a sum of components comprising: a first square of a first product of factors comprising: a first probability that the first calculation will be determined by the third calculation; and a first error associated with the third calculation; a second square of a second product of factors comprising: a second probability that the first calculation will be determined by the fourth calculation; and a second error associated with the fourth calculation; and a third product of factors comprising: the first probability; the second probability; and a third square of a second value calculated based on a difference between (a) a third value calculated based on the third calculation and (b) a fourth value calculated based on the fourth calculation; and displaying, or communicating to a person, or propagating to be used in determining a third error associated with a fifth calculation, the first value.

This summary section is provided to introduce a selection of concepts in a simplified form that are further described below in the detailed description section. This summary is not intended to identify key features or essential features of the claimed subject matter, nor is it intended to be used to limit the scope of the claimed subject matter.

DETAILED DESCRIPTION

Overview

In some circumstances, a result is determined by a plurality of alternative calculations. Depending on the circumstances that exist, the result could be determined by any of the alternatives. Each calculation may have error associated with it due to measurement imprecision, rounding, etc., but the uncertainty as to which calculation will be used to determine the result is an additional source of error. It may be useful to take these various sources of error into account.

Example Calculations

Figure 1:
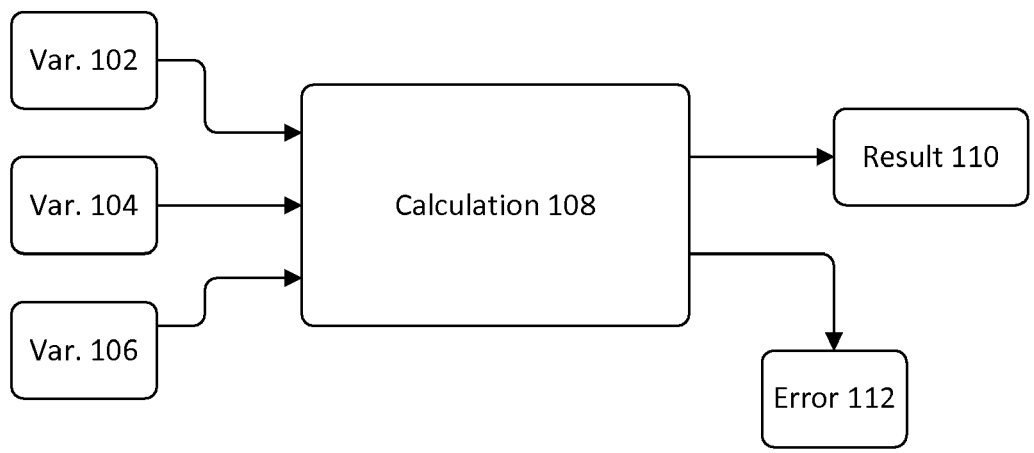
FIG. 1 is a block diagram of a calculation.

FIG. 1 shows a calculation 108. Calculation 108 may be a function, such as a continuous or discrete mathematical function, that takes variables 102, 104, and 106 as input, and produces result 110 as output. In the example of FIG. 1, three variables are shown, but calculation 108 could also take any number of variables as input. Additionally, the example of FIG. 1 shows a single result 110 as output, but calculation 108 could also produce any number of results. Moreover, input variables 102, 104, and 106, and output result 110, can each be composed of any number of dimensions, which is to say that each of the input variables or output results can be made up of any number of one or more vector or scalar quantities. The depiction in FIG. 1 is not intended to limit calculation 108 to any particular type of calculation, any particular type of input, or any particular type of result.

Calculation 108 has associated with it an error 112. Error 112 may be due to any factors that can cause an imprecision in calculation 108's generation of result 110, such as measurement error, rounding error, etc.

As one example, calculation 108 may be a function that calculates an amount of money based on input variables 102, 104, and 106. In such an example, result 110 represents an amount of money. The amount may be expressed, for example, in dollars rounded to the penny (or tenth of a penny, or hundredth of a penny, etc.), and error 112 represents the imprecision due to rounding. For example, if calculation 108 rounds to the penny and produces a result 110 equal to $16.72, then error 112 may be ±$. 005, representing the fact that the rounded value $16.72 may have resulted from a true calculation that produced a value ranging from $16.715 and $16.725. In an example discussed below, calculation 108 may be used to determine the cost of energy, as expressed, e.g., in dollars per megawatt hour, although this example does not limit the subject matter described herein.

Figure 2:
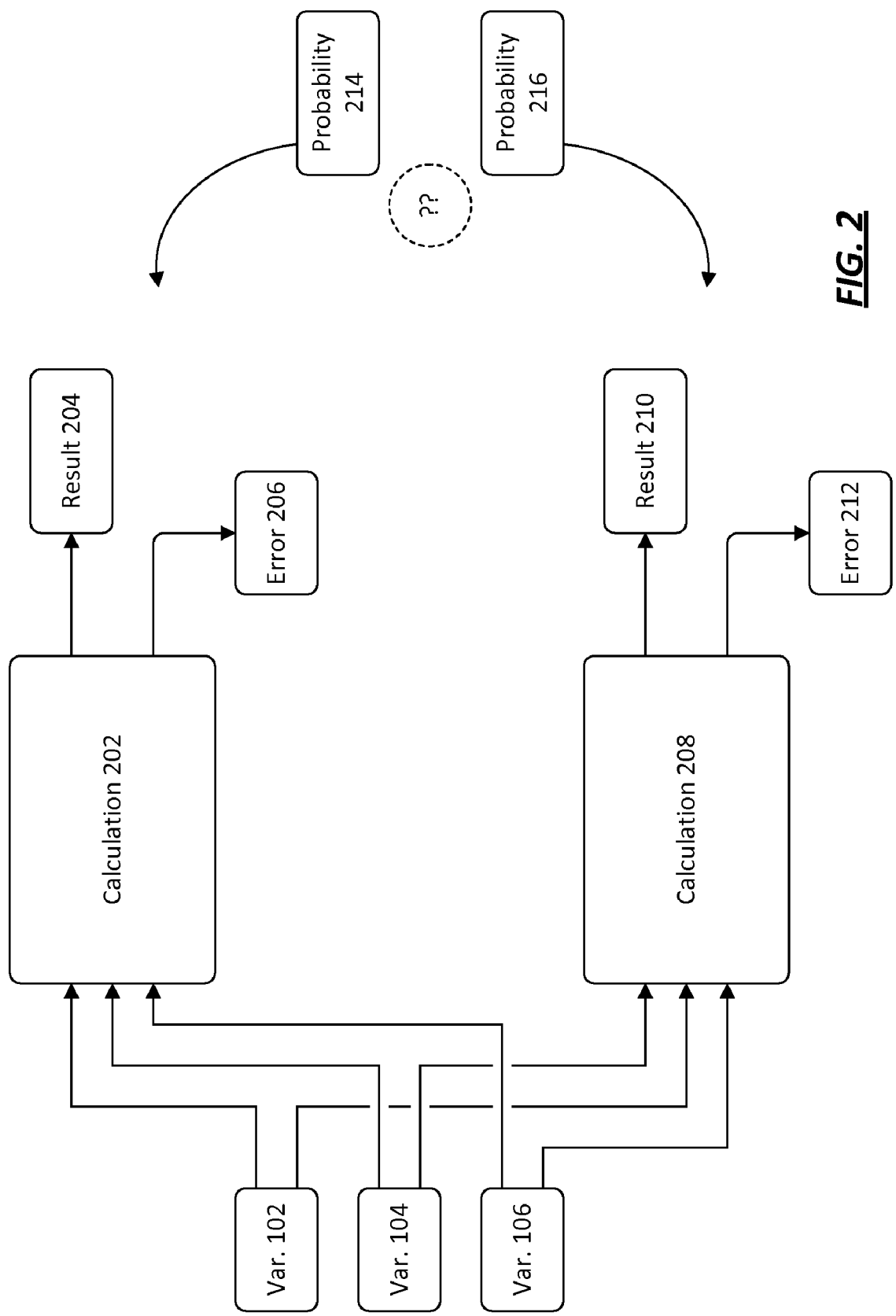
FIG. 2 is a block diagram of two calculations, and the respective probabilities as to which of the calculations will be used.

FIG. 2 shows two example calculations 202 and 208. Each of these calculations is similar to calculation 108 discussed above in connection with FIG. 1. Calculations 202 and 208 each take variables 102, 104, and 106 as input variables. (As is the case with calculation 108, the number of input variables—three in this case—is merely an example, and does not limit the subject matter described herein. Calculations 202 and 208 could take any number of input variables from 1 to n.)

Calculations 202 and 208 represent different ways of processing input variables 102, 104, and 106. For example, calculations 202 and 208 could be different mathematical functions. Calculations 202 and 208 may each be dependent on all of input variables 102, 104, and 106, or they may be dependent on different subsets of these input variables, or each function may take into account additional inputs that are not shown. If calculations 202 and 208 take into account additional inputs beyond what is shown in FIG. 2, these additional inputs could be the same for both functions, but the functions could also take into account different overlapping or non-overlapping sets of additional inputs.

Calculations 202 and 208 produce results 204 and 210, respectively. Results 204 and 210 are each similar to result 110, shown in FIG. 1. Additionally, calculations 202 and 208 are associated with errors 206 and 212, respectively. Errors 206 and 212 are each similar to error 112, shown in FIG. 1.

In FIG. 2, there are two possible calculations, 202 and 208, that can be made over variables 102, 104, and 106. In some situations, a result can be alternately determined by two (or more) calculations, and which calculation applies in a given circumstance may depend on factors such as the values of variables 102, 104, and/or 106, or one or more external factors. A probability that a particular calculation will apply can be determined based on the likelihood that that a particular set of circumstances will exist. Below, examples will be discussed in which different calculations would apply depending on circumstances, but for the purpose of this description of FIG. 2, it is sufficient to note that there may be different calculations that apply in different circumstances, and it is possible to assign a probability that a given calculation will be applicable.

In the example of FIG. 2, probability 214 represents the chance that calculation 202 will apply, and probability 216 represents the chance that calculation 208 will apply. (The question marks in the diagram represent the uncertainty as to which of calculations 202 and 208 will apply, which arises in the situation where neither probability is 0% or 100%.)

In the example of FIG. 2, in which either calculation 202 or calculation 208 applies, probability 214 and probability 216 are complements of each other—e.g., if probability 214 is represented by the symbol $\mu$ where $0 \leq \mu \leq 1$, then probability 216 is $1-\mu$. (Representing a probability as a number between zero and one is only one example of how to represent a probability. As another example, a probability can be represented as a percentage between zero and 100, in which case the mathematical expressions would be modified accordingly.) It should be noted FIG. 2, in which one of two possible calculations applies, is merely an example. In greater generality, there could be n calculations, each of which has an assigned probability of being the applicable calculation.

In one example, the decision as to whether a given calculation applies may be based on whether the input variables meet some set of criteria. One way to view this situation is in the language of mathematical functions, where it could be said that the different calculations are different functions having the same domain, but each function applies to a defined sub-region of the domain.

Figure 3:
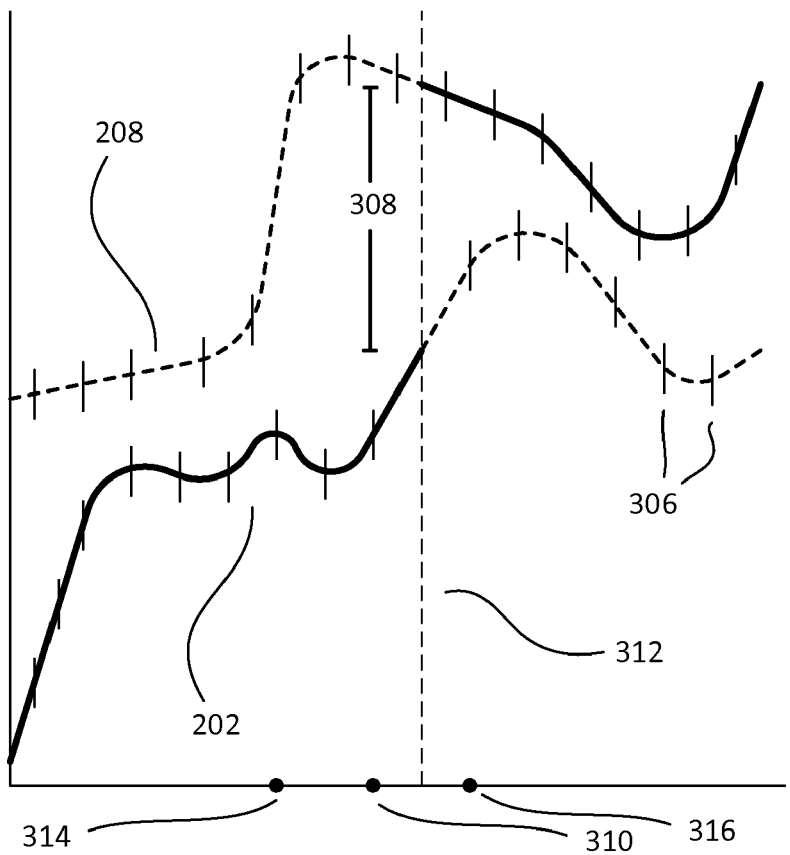
FIG. 3 is a block diagram of two calculations, plotted on a graph as continuous functions.

FIG. 3 shows an example of calculations 202 and 208, in which the domain is one-dimensional and has been bifurcated at the partition represented by line 312, such that calculation 202 applies to input values that are less than the point along the horizontal axis that intersects line 312, and calculation 208 applies to input values that are greater than that point. (The point represented by line 312 could be assigned to either calculation 202 or 208; e.g., if the point is assigned to calculation 202, then one would say that calculation 202 applies to input values that are less than or equal to that point.) It should be understood that calculations need not be made over one-dimensional domains, and the domain need not be divided into sub-regions based on a simple less-than/greater-than test. For example, the domain of calculations 202 and 208 could be $A_0 \times \ldots \times A_n$, and, for $a_i \in A_i$, a Boolean function $f(a_0, \ldots, a_n)$ determines, according to some arbitrary algorithm, whether calculation 202 or calculation 208 applies. That is, calculation 202 could apply where $f$ evaluates to true, and calculation 208 could apply where $f$ evaluates to false, even if this situation results in the applicable regions of calculations 202 and 208 being scattered throughout the domain.

In FIG. 3, calculations 202 and 208 are each represented as curves on a graph, with lines 306 representing the error in those calculations. On these curves, the solid portions represent each calculation in the domain sub-region to which the calculation applies, and the dashed portions represent the calculation in the portion of the sub-region to which the calculation does not apply. Thus, the solid and dashed portions along calculations 202 and 208 show that calculation 202 applies to input values less than or equal to the point represented by line 312, and that calculation 208 applies to input values greater than that point.

When the two portions of each calculation that apply over their respective sets of input values—e.g., the two solid portions—are put together, it can be seen that a discontinuity results, which is represented in the example of FIG. 2 as gap 308. When an error is to be calculated, it can be seen that determining the error associated with a calculation may not be as simple as observing the distances represented by lines 306 when the input value is near the discontinuity. For example, if the input value to calculations 202 and 208 is the point represented by 310 on the graph, then a small amount of uncertainty as to whether 310 is the true input value can translated into a larger uncertainty (e.g., error) in the result. If, say, the input value might fall in the range between points 314 and 316, then—depending on how far to the right of point 310 the input value might fall—the error could either be small (e.g., close to the size represented by lines 306, based on the error inherent in each of calculations 202 and 208), or it could be large (e.g., close to the size of gap 308, based on the uncertainty as to whether the result will actually be determined by calculation 202 or by calculation 208).

It should be noted that calculations 202 and 208 are not applicable on opposite sides of line 312, but this fact does not mean that these calculation are undefined in their non-applicable regions. As is shown by the dashed lines, calculations 202 and 208 are continuously defined throughout the region shown in the graph of FIG. 3, even in portions where they are deemed not applicable based on the value of the input (domain) variable. For example, it is possible to calculate a result based on formula 208 for the input value represented by point 314, even though such result might not later apply to the ultimate result that is being computed. Such a result, however, may be used in the formula discussed below in connection with FIG. 4.

A technique of calculating error can take into account both the error inherent in calculations 202 and 208, as well as error contributed by uncertainty as to which calculation will apply.

In one example, A and B are two separate calculations (such as calculations 202 and 208, shown in FIG. 2). C is a third calculation that can be described as:

$$if(\mu, A, B) = C.$$

That is, C is a calculation whose result is determined either by calculation A or by calculation B, with a probability $\mu$ that represents the likelihood as to which of the calculations will apply. In terms of computer programming, this scenario can be described by the following example pseudo-code:

```
C(n) {
    if (n <= CONST)
        return A(n);
    else
        return B(n);
}
```

This example is in the case where C is determined by one of exactly two functions, A or B, depending on how the input values (n) compares to a constant (CONST). In somewhat greater generality, where C could be determined by one of several calculations $A_0, \ldots, A_k$, and the function d(n) determines which one of these functions is applicable based on the input parameters, the situation might be represented in pseudo-code as follows:

```
C(n) {
    if (d(n) == 0)
        return A[0](n);
    else if (d(n) == 1)
        return A[1](n);
    ...
    else if (d(n) == k-1)
        return A[k-1](n);
    else
        return A[k](n);
}
``` where A in the foregoing pseudo-code is an array of functions subscripted from 0 to k.

In the example to be discussed below, C is a calculation that is determined by one of two possible calculations, A and B. In this example:

a and b are results produced by calculations A and B, respectively, for some set of one or more input variables;

$\epsilon_a$ and $\epsilon_b$ are errors associated with calculations A and B, respectively;

$\mu$ is the probability that the result of calculation C will be determined by calculation A (where $\mu$ is expressed, by way of example, as a value that satisfies $0 < \mu < 1$).

Given the above description, it is possible to calculate a result, c, of calculation C, and an error, $\epsilon_c$, associated with that result, based on the following formula:

$$(c, \epsilon_c) = (\mu a + (1-\mu)b, \sqrt{(\mu \epsilon_a)^2 + ((1-\mu)\epsilon_b)^2 + \mu(1-\mu)(a-b)^2}).$$

Figures 4, 5:
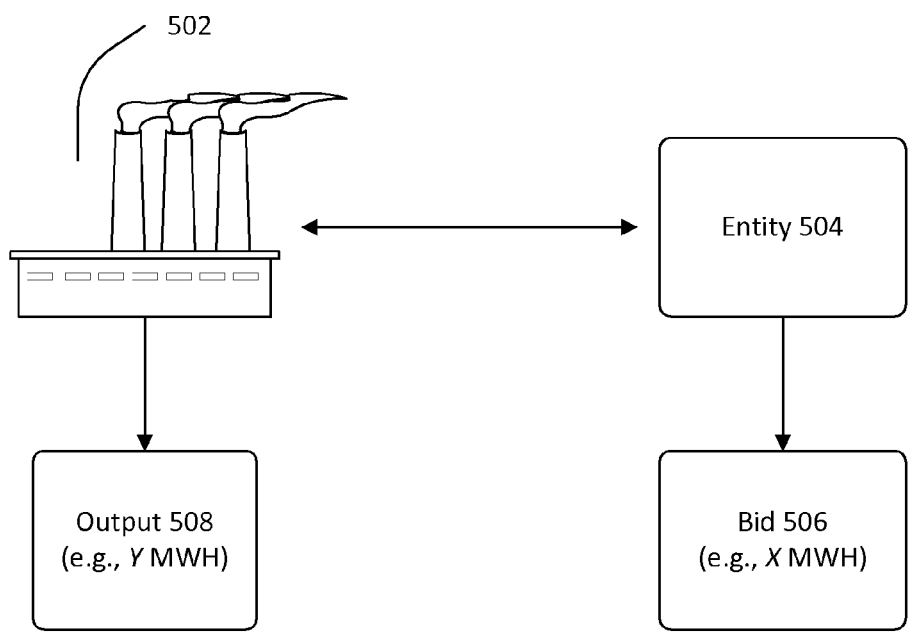
FIG. 4 is a diagram of an equation.
FIG. 5 is a block diagram of a source of energy, and certain other features.

This formula is also shown in FIG. 4 as formula 400.

Referring to FIG. 4, the various components of formula 400 are shown. It should be noted that the formula need not be used in its entirety, but rather individual components may be used. For example, one can use a portion of formula 400 to calculate an error, irrespective of whether formula 400 is used to calculate a result. Moreover, portions of formula 400 can be modified as needed—e.g., to take into account the case where there are more than two underlying calculations A and B.

In formula 400, c (402) represents a result of calculation C, and EC (404) represents an error associated with calculation C. μ (406) represents the probability that calculation C will be determined by calculation A, and a (408) represents a result calculated based on formula A, for some given set of input variables. Product 410 is an arithmetic product of μ (406) and a (408). The expression (1−μ) (412) represents a complement of μ (406). In terms of probabilistic logic, the expression (1−μ) represents "not μ"—i.e., if μ is the probability that something is true, then (1−μ) is the probability that the same thing is not true. It should be noted that, in the case where there are two alternative formulas on which calculation C is based (i.e., in the specific, non-limiting example where B is the applicable calculation whenever A is not, and vice versa), then, conveniently, it happens to be the case that the probability that B will apply happens is the same as the probability that A will not apply. However, if there were more than two potential calculations, each could be assigned its own probability as to whether that particular calculation would apply. b (414) represents a result calculated based on formula b for the same set of input variables as is used in formula A. Product 416 is an arithmetic product of (1−μ) (412) and b (414).

The sum of product 410 and product 416 is an estimated result of calculation C. This sum represents a statistical average of what calculation C would be, for particular input value(s), depending on whether calculation A or calculation B ultimately applies. That is, it is simply the sum of results a and b, based on calculations A and B, respectively, where each result is multiplied by the factional chance that a particular one of those calculations will be the applicable one from which calculation C is determined.

A square root 418 is taken of a sum of three components 424, 430, and 480. Square root 418 represents the error, $\epsilon_c$, associated with calculation C, taking into account the errors associated with calculations A and B, the respective probabilities that calculations A and B will apply, and the error associated with the uncertainty as to whether calculation A or B will actually be the applicable calculation to determine calculation C.

Term 424 is a square of a product of two terms, μ (406) and $\epsilon_a$ (422), where $\epsilon_a$ is the error associated with calculation A. Term 424 thus represents the error associated with calculation A, multiplied by the probability that calculation A will be the determining component of calculation C.

Term 430 is a square of a product of two terms, (1−μ) (412) and $\epsilon_b$ (428), where $\epsilon_b$ is the error associated with calculation B. Term 430 thus represents the error associated with calculation B, multiplied by the probability that calculation B will be the determining component of calculation C.

Term 438 is a product of three terms, ∈ (406), (1−μ) (412), and $(a-b)^2$ (436). Term 436 is the square of a difference between the results produced by calculations A and B for a given set of input variables. Term 438 represents the portion of the error in calculation C that is caused by the uncertainty as to whether calculation C will be determined by calculation A or by calculation B.

It should be noted that term 438 is not derived merely from algebraic and logical inferences based on calculation A and calculation B. Rather, term 438 represents a way of accounting for the uncertainty as to whether calculation C will be determined by calculation A or calculation B. Term 438 as a whole, as well as it's component features—e.g., its use as an addend under the radical, the squaring of the difference represented by term 436, the choice of μ (406) and (1−μ) (412) as products in the term—both independently, collectively, and in all of their subcombinations, represent choices about how to account for the uncertainty as to which of calculations A and B will apply, how much weight to assign to that uncertainty, etc. Term 438 provides a first-order approximation of the error based, e.g., on uncertainty as to whether calculation A or B applies. This first-order approximately is applicable assuming various types of error distribution—e.g., uniform, Gaussian, etc.

Example Scenario Involving Energy Pricing

The pricing of energy (e.g., output from an electrical power plant) is one area in which the above techniques may be used to determine error. In some cases, the price (tariff) that is paid to a producer of energy is based on different formulas depending on whether the producer of energy has made its bid for the amount of energy to produce (sometimes referred to as a quota).

FIG. 5 shows an example of this situation. Power plant 502 is associated with an entity 504 (such as an owner of the plant, an agent or broker for the plant's power, etc.). Entity 504 provides a bid 506 that power plant 502 will produce a certain amount of energy (e.g., X megawatt hours). Assuming that bid 506 is accepted by the relevant party, at some point, during some term, power plan 502 will produce an output 508 equal to Y megawatt hours. Whether the actual output 508 meets the bid or falls short may determine the price paid to the energy producer for all of the energy produced by that power plant.

Figure 7:
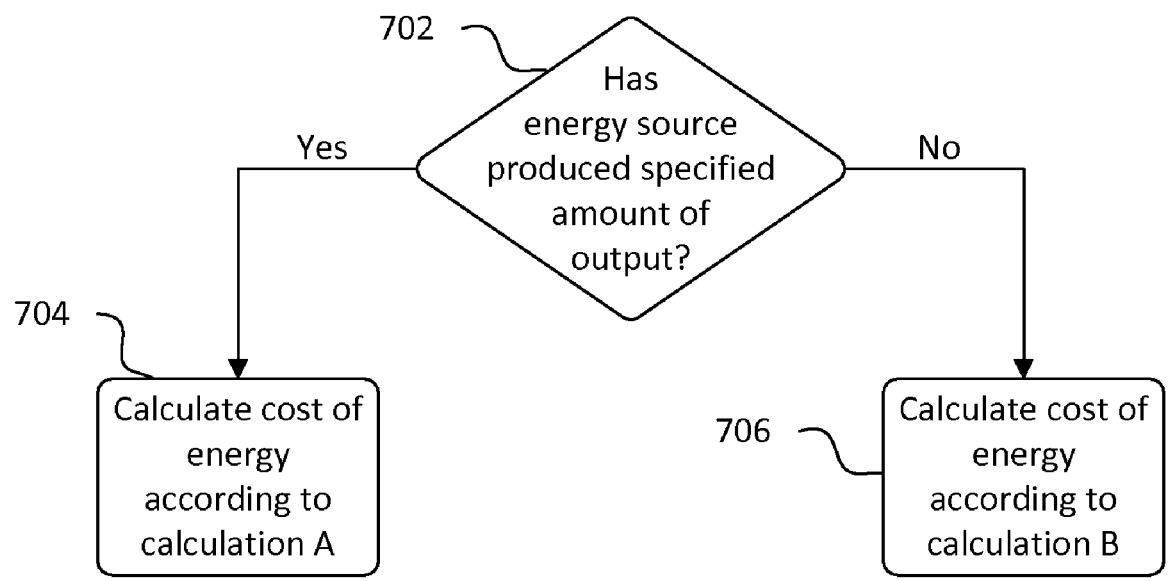
FIG. 7 is a flow diagram of a decision as to which calculation to use to calculate a cost of energy.

For example, referring to FIG. 7, there may be two calculations (A and B) that determine the cost of energy, and which of these two calculations applies depends on whether an energy source, such as power plant 502 (shown in FIG. 5), has produced a specified amount of output (such as the amount proposed in bid 506, also shown in FIG. 5). In this scenario, a decision 702 is made as to whether the energy source has produced a specified amount of output. If the energy source has produced the specified amount of power, then, at 704, the cost of energy is calculated according to calculation A. If the energy source has not produced the specified amount of power, then, at 706, the cost of energy is calculated according to calculation B.

The situation where different pricing calculations apply depending on whether an energy producer has met its bid for output is only one example of a situation where alternative calculations can apply in the energy field. As another example, there may be different rules for hydroelectric power, gas turbine power, etc., and there may be credits for times that the power producer turned down the power in order to keep voltage constant. These factors, and others, may introduce complexity and/or uncertainty into the calculation for the cost of power, which can be accounted for using various techniques described herein.

Example Process

Figure 6:
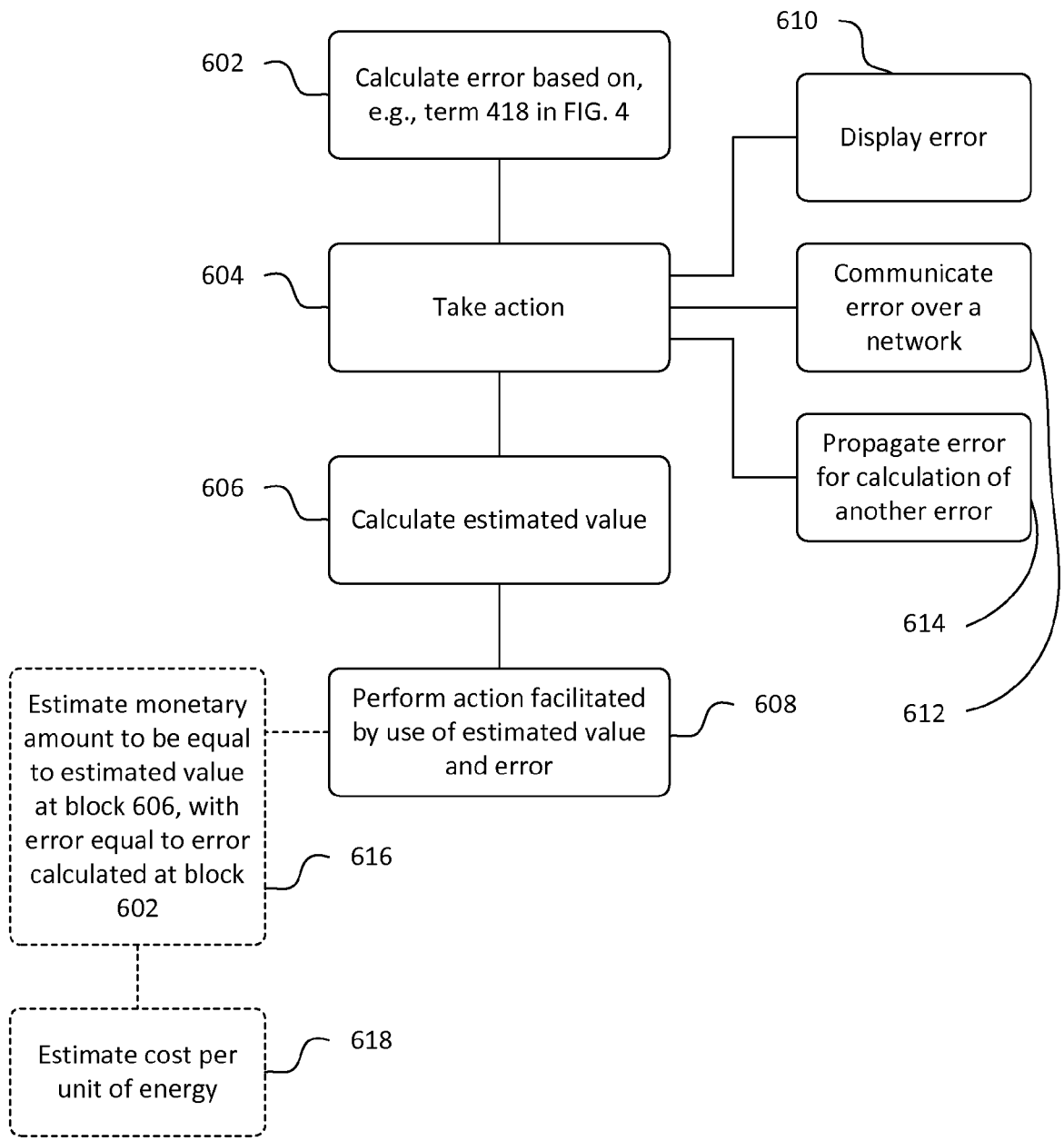
FIG. 6 is a flow diagram of a process involving an estimated value and a calculation of error.

FIG. 6 shows an example process involving the calculation of an estimated value and an associated error. It should be noted that the lines between the various boxes in FIG. 6 are not intended to suggest that the actions depicted in the figure necessarily proceed from block to block in the order shown; rather, these actions can proceed in any order, and in any combination or sub-combination. Moreover, it should be noted that the actions shown are not limited to the contexts and systems discussed elsewhere in this document, but rather could be performed in any system.

At 602, an error is calculated. This calculation of error may, for example, be based on term 418 in FIG. 4.

At 604, an action is taken involving the calculated error. Examples of such actions include: displaying the error (610); communicating the error over a network (612) (such as over network 806, shown in FIG. 8 and discussed below); and propagating the error for use in calculating another error (614). It will be noted that blocks 610, 612, and 614 are all examples of useful and tangible actions. For example, displaying an error to a user is both useful and tangible to a user who has a reason, desire, or interest in knowing the error. Communicating the error over a network is useful and tangible, in the sense that the error can then be perceived by a user at another point on the network, or could otherwise be used by another component in the network. Propagating the error to another calculation is useful and tangible in the sense that it allows accumulated error to be taken into account (and, additionally, the further calculation may then display or communicate a result based on the earlier error).

Regarding the propagation of error for another calculation, it should be noted that a calculation of a result, and its associated error, may be an intermediate step in some larger calculation. For example, if calculation C (based on calculation A or B, as previously discussed) is used to calculate a result, c, and an error, $\epsilon_c$, then result c may be an intermediate result that is later used in a further calculation. If so, then the error, $\epsilon_c$, may be propagated to that further calculation so that the cumulative effect of the error in calculation C, and the error applicable to the subsequent calculations, can be determined.

At 608, an estimated value is calculated. For example, the result determined by the sum of terms 410 and 416 in FIG. 4 may be the estimated value.

At 610, an action is performed that is in some way facilitated by the use of the estimate error calculated at 602, and the estimated value calculated at 606. An example of such an action includes (at 616) estimating a monetary amount to be equal to the estimated value calculated at 606, with an error equal to the error calculated at block 602. In a further example (at 618), this estimate of a monetary amount is a cost per unit of energy, as discussed above in connection with FIGS. 5 and 7.

Example Implementation

Figure 8:
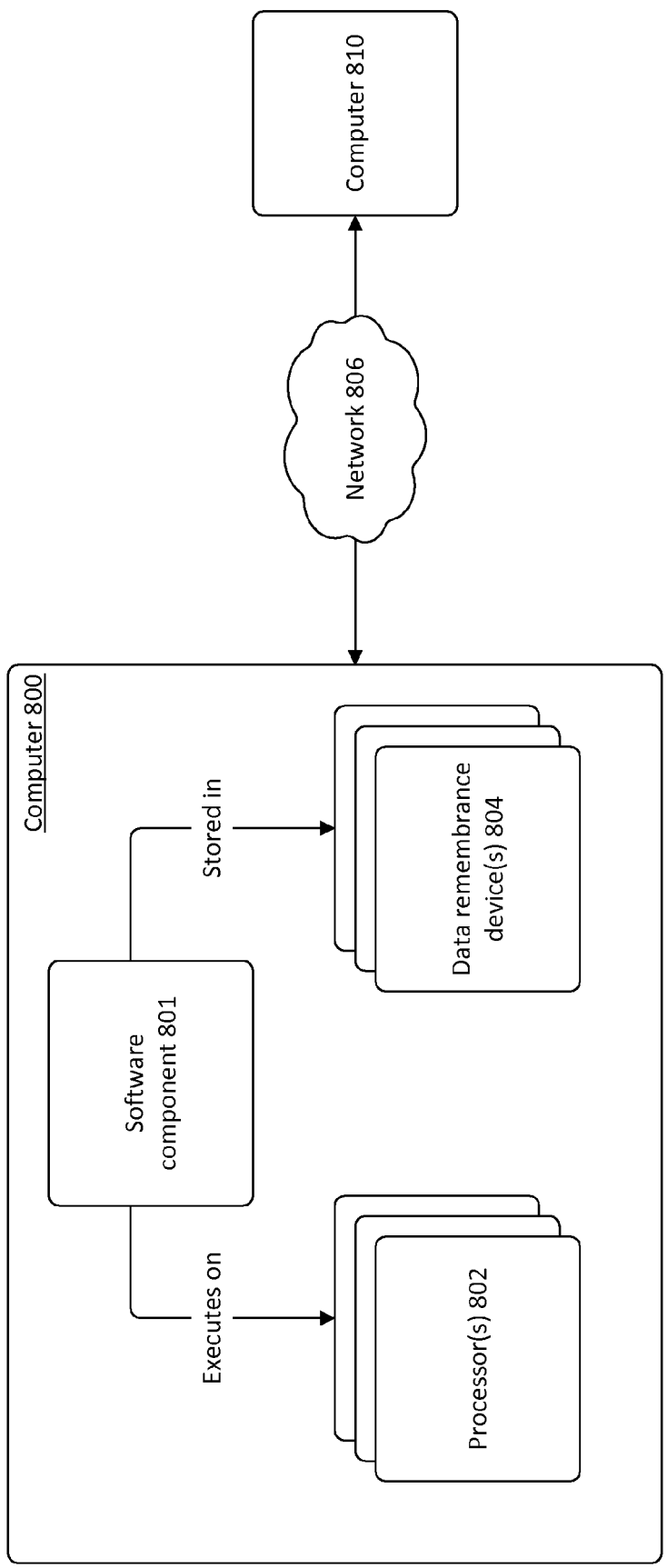
FIG. 8 is a block diagram of an environment in which aspects of the subject matter described herein may be deployed.

FIG. 8 shows an example environment in which aspects of the subject matter described herein may be deployed.

Computer 800 includes one or more processors 802 and one or more data remembrance devices 804. Processor(s) 802 are typically microprocessors, such as those found in a personal desktop or laptop computer, a server, or a handheld computer. Data remembrance device(s) 804 are devices that are capable of storing data for either the short or long term. Examples of data remembrance device(s) 804 include hard disks, removable disks (including optical and magnetic disks), volatile and non-volatile random-access memory (RAM), all types of read-only memory (ROM), flash memory, magnetic tape, etc. Data remembrance device(s) are examples of computer-readable media. Computer-readable media include both storage media such as data remembrance device(s) 804, as well as media that carry data ephemerally, such as electronic, magnetic, or optical signals.

Software, such as software component 801, may be stored in the data remembrance device(s) 804, and may execute on the one or more processor(s) 802. A personal computer in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance device(s) 804 and that executes on one or more of the processor(s) 802. As another example, the subject matter can be implemented as software having instructions to perform one or more acts, where the instructions are stored or carried on one or more computer-readable media.

In a typical environment, computer 800 may be communicatively connected to one or more other devices through network 806. Computer 810, which may be similar in structure to computer 800, is an example of a device that can be connected to computer 800, although other types of devices may also be so connected.

Other Examples

It should be noted that expressions such as $\mu$, $1-\mu$, $\mu a$, etc., which have been used in the foregoing explanation, are examples based on an assumption that probabilities are expressed in values such that $0 \leq \mu \leq 1$. These equations can readily be adjusted for other representations of probabilities. For example, if a probability $\mu$ is expressed as a values between zero and 100, then the phrase $1-\mu$ can be replaced with $1-\mu/100$. Similar modifications to other portions of the equations shown herein can be made, and the mathematical expressions shown herein can be understood as encompassing such modified versions.

Additionally, it should be noted that, in addition to the energy-related examples given above, the techniques provided herein may be useful in other contexts. Financial and insurance markets are two additional examples of situations where calculations may be based on a complex set of alternatives based on the ambient conditions, and both of these markets are examples of situations where the subject matter described herein may apply.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer readable media having computer-readable and computer-executable program code embodied therein for causing a computer system to execute a method for calculating a monetary cost of energy consumption, comprising:

performing a first calculation of the cost of energy consumption when a first variable used in said first calculation satisfies a first criteria, a first error being associated with said first calculation, wherein said first calculation comprises a first rate applied to said first variable to calculate the monetary cost of energy consumption in dollars per megawatt hours, and wherein said first error comprises a rounding error;

performing a second calculation of the cost of energy consumption when said first variable does not satisfy said first criteria, a second error being associated with said second calculation, wherein said second calculation comprises a second rate applied to said first variable to calculate the monetary cost of energy consumption, and wherein said second error comprises a rounding error;

calculating a third error that is a function of: said monetary cost of energy consumption determined by said first calculation, said monetary cost of energy consumption determined by said second calculation, said first error, said second error, and a predetermined probability that said first variable satisfies said first criteria, wherein said third error represents an uncertainty as to whether the first calculation or the second calculation is used to calculate the monetary cost of energy consumption; and performing at least one of the following:
   displaying said third error;
   communicating said third error over a network, and
   propagating said third error to a calculation of a fourth error, wherein said fourth error is accumulated third error.

2. The computer readable media of claim 1, wherein said first criteria comprises a quota of output associated with a power source, wherein said first variable comprises a variable that represents an amount of output that has been produced, or is to be produced, by a power source, and wherein whether the first calculation or the second calculation is used depends on a relationship between said amount of output and said quota.

3. The computer readable media of claim 2, wherein said first calculation determines the monetary cost of energy consumption when said amount of output does not satisfy said quota, wherein said first calculation includes a first cost for failure to meet said quota, and wherein said first cost is not present in said second calculation.

4. The computer readable media of claim 1, wherein said first criteria comprises an amount of output that a party associated with a power source has bid for said power source to produce, wherein said first variable represents an amount of output that has been produced, or is to be produced, by said power source, and wherein the monetary cost of energy consumption is determined by said first calculation when said power source produces said amount of output, and wherein the monetary cost of energy consumption is determined by said second calculation when said power source does not produce said amount of output.

5. The computer readable media of claim 1, wherein said second calculation determines the monetary cost of energy consumption when said first calculation does not determine the monetary cost of energy consumption.

6. The computer readable media of claim 1, further comprising:
   calculating a first value as a sum of components comprising:
      a first product of factors comprising: said probability; and a second value calculated by applying said first calculation to an instance of said first variable; and
      a second product of factors comprising: said complement of said probability; and a third value calculated by applying said second calculation to said instance of said first variable.

7. The computer readable media of claim 1, wherein said first calculation is discontinuous with said second calculation.

8. A non-transitory computer readable media having computer-readable and computer-executable program code embodied therein for causing a computer system to execute a method, comprising:
   performing a first calculation for a first measurement of a monetary cost of energy consumption in dollars per megawatt hours when a first variable used in said first calculation satisfies a first criteria, a first error being associated with said first calculation, wherein said first calculation is a first function applied to said first variable, and wherein said first error is a rounding error;
   performing a second calculation for a second measurement of the monetary cost of energy consumption in dollars per megawatt hours when said first variable does not satisfy said first criteria, a second error being associated with said second calculation, wherein said second calculation is a second function applied to said first variable, and wherein said second error is a rounding error;
   calculating a third error that is a function of: said first calculation, said second calculation, said first error, said second error, and a predetermined probability that said first variable satisfies said first criteria, wherein said third error represents an uncertainty as to whether the first calculation or the second calculation is used to calculate the monetary cost of energy consumption; and
   performing at least one of the following:
      displaying said third error;
      communicating said third error over a network; and
      propagating said third error to a calculation of a fourth error, wherein said fourth error is accumulated third error.

9. The computer readable media of claim 8, wherein said first function comprises a first rate, and wherein said second function comprises a second rate, said second rate being different from said first rate.

10. The computer readable media of claim 8, wherein said second calculation determines said second measurement of the monetary cost of energy consumption when said first calculation does not determine said first measurement of the monetary cost of energy consumption.

11. The computer readable media of claim 8, further comprising:
   calculating a first value as a sum of components comprising:
      a first product of factors comprising: said probability; and a second value calculated by applying said first calculation to an instance of said first variable; and
      a second product of factors comprising: said complement of said probability; and a third value calculated by applying said second calculation to said instance of said first variable.

12. The computer readable media of claim 8, wherein said first calculation is discontinuous with said second calculation.

* * * * *